Patented Feb. 7, 1939

2,145,905

UNITED STATES PATENT OFFICE 2,145,905

PROCESS FOR PREPARING POLYNUCLEAR ISOCYCLIC FUSED RING COMPOUNDS, E. G., PERYLENE

Viktor Weinmayr, Pitman, N. J., assignor to E. I. du Pont de Nemours & Company, Wilmington, Del., a corporation of Delaware No Drawing. Application August 3, 1937, Serial No. 157,224

18 Claims. (Cl. 260—670)

This invention relates to a novel method of preparing polynuclear isocyclic compounds, more particularly to the preparation of such compounds by condensing isocyclic compounds containing at least two benzene rings with acrolein or methacrolein, and still more particularly to performing these reactions in hydrofluoric acid.

There is no record in the literature that condensations of the above type have been performed, indeed the impression is gained from studying the art that hydrofluoric acid is too strong a polymerizing agent to make such condensations possible.

This invention has as an object the provision of a method for the preparation of polynuclear isocyclic compounds from an open chain alpha-beta unsaturated aldehyde and polynuclear compounds by means of the condensing action of hydrofluoric acid.

A further object is the preparation of certain new compounds useful as intermediates for dyes. Other objects will appear hereinafter.

These objects are accomplished by the following invention wherein an isocyclic polynuclear organic compound containing at least two fused aromatic benzene rings is condensed with an open chain alpha-beta unsaturated aldehyde of the formula

RCH=CR'—CHO wherein R and R' are any saturated univalent open chain residues e. g., hydrogen, an alkyl group, halogen, etc. with the aid of liquid hydrogen fluoride.

The more detailed practice of the invention is illustrated by the following examples, wherein parts given are by weight unless otherwise stated. There are of course many forms of the invention other than these specific embodiments.

*Example I.—Perylene from 1,10-trimethylene-9-hydroxyphenanthrene*

Five hundred parts of practically anhydrous hydrofluoric acid was weighed into a vessel provided with agitation and means of recording the temperature, and cooled to 10–15° C. Sixty seven parts of acrolein and 117 parts of 1,10-trimethylene-9-hydroxyphenanthrene were added over a period of about one hour as uniformly as possible at a temperature of 10–20° C. The charge was agitated at this temperature for several hours and then poured onto ice. The greenish precipitate was filtered, washed acid free, washed with warm dilute ammonia, and dried. One hundred and forty two parts of a light brown powder was obtained, melting from 250–300° C. The product is soluble in sulfuric acid with green color, which changes quickly to blue and purple and consists of a mixture of hydrogenated perylenes and other condensation products. Perylene is obtained from this crude condensation product by zinc dust distillation, by dehydrogenation with sulfur, or by distillation with mercury vapors. Five parts of the crude product are distilled with mercury vapors and the distillate is separated from the mercury with a solvent, e. g. benzene. Perylene melting from 263–266° C. was obtained when this benzene solution was concentrated until crystallization set in. Its identity was established by analysis, mixed melting point with an authentic sample of perylene, and by its typical color of solution in sulfuric acid.

*Example II.—Perylene from 1,10-trimethylene-9-hydroxyphenanthrene*

1,10-trimethylene-9-hydroxyphenanthrene, 23.4 parts, and 12 parts of acrolein were slowly added to a mixture of 50 parts of hydrofluoric acid and 40 parts of 100% sulfuric acid at 20–25° C. The charge was held at this temperature for several hours and then poured onto ice. The greenish precipitate was filtered and washed acid free. Thirty-two parts of a light brown powder was obtained from which pure perylene can be isolated by any of the methods mentioned in Example I.

*Example III.—Perylene from phenanthrene*

Forty parts of phenanthrene was dissolved in 360 parts of hydrofluoric acid and 25 parts of acrolein was added at 3–5° C. over a period of about 20 minutes. The charge was maintained at 0–5° C. for 45 minutes during which time a granular precipitate formed in the acid. The charge was then poured onto ice, the precipitate filtered and washed acid free. Forty-eight parts of a greenish yellow solid was obtained, soluble in strong sulfuric acid with a redbrown color which changed to purple after a short while. Perrylene was isolated by the mercury vapor distillation. The distillate contained, beside the perylene, some benzanthrone. By digesting the distillate with cold acetone pure perylene was separated.

Perylene has the structure

It is to be noted that, in Examples I and II, a compound containing four rings and having a

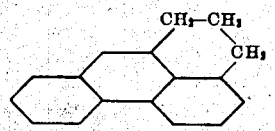

nucleus reacts by a condensation of carbon atoms 1 and 3 of the alpha-beta unsaturated aldehyde $CH_2=CH—CHO$ with two different carbon atoms of the polynuclear compound to give perylene which contains five rings. In Example III phenanthrene containing three rings similarly reacts with two molecules of acrolein to give perylene which contains five rings.

*Example IV.—Benzpyrene from 9,10-dihydroanthracene*

9,10-dihydroanthracene, 39.6 parts, was dissolved in 200 parts of anhydrous hydrofluoric acid and 27 parts of acrolein added at 5–10° C. within about one hour. When about one-half of the acrolein had been added a sample of the reaction mass tested in sulfuric acid showed a red color of solution with a strong yellow fluorescence. After the addition of the acrolein the temperature of the reaction mass was raised to 15–20° C. and maintained there for about 20 hours. The reaction mass was poured onto ice and the precipitate filtered and washed acid free. Fifty-seven parts of a brown powder was obtained, soluble in organic solvents with yellow color and dull green fluorescence, in strong sulfuric acid with red brown color and faint red fluorescence. This crude material melts from 140–180° C. and consists of hydrogenated benzpyrene and other condensation products. A crystalline material was obtained when this crude product was distilled with mercury vapors and separated from the mercury by extraction with benzene. The product was crystallized from glacial acetic acid and then showed a melting point of 169–170° C. The product dissolved in sulfuric acid almost without color showing only a faint red fluorescence. The picrate formed from this compound melted at 223–225° C. The analyses of the product and its picrate indicate that a benzpyrene had been formed. This is probably of the formula

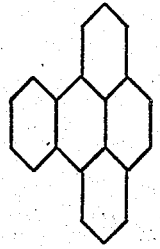

as described by Cook et al. in Journ. Chem. Soc. 1933, 395, although the melting points of the product and its picrate are somewhat lower than those given by Cook.

It is to be noted that two acrolein residues have condensed with the anthracene nucleus which contains three rings to give a benzpyrene containing five rings.

*Example V.—Perinaphthindone*

Seventy-two parts of alpha naphthol and 56 parts of acrolein were charged simultaneously into 530 parts of practically 100% hydrofluoric acid, maintained at 15–20° C. The charge was maintained at this temperature for several hours and then poured onto water. One hundred and five parts of a light brown reaction product was obtained which dissolved in strong sulfuric acid with yellow color showing a strong green fluorescence. This crude product was extracted with boiling commercial dichlorobenzene; the solvent removed by steam distillation, and pure perinaphthindone obtained melting at 150° C., identified by a mixed melting point with an authentic sample and by its color and fluorescence in sulfuric acid.

Naphthindone has the formula:

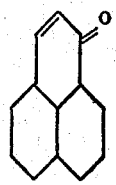

contains three rings and is obtained from naphthol containing but two rings.

*Example VI.—Condensation of acenaphthene with acrolein*

Acenaphthene, 30.8 parts, was dissolved in 370 parts of hydrofluoric acid and 28 parts of acrolein added at 15–18° C. in about 10 minutes. After the charge had been agitated at 15–20° C. for about one hour a fine precipitate began to form in the hydrofluoric acid. The reaction mass was then poured onto ice and the light brown precipitate filtered and washed. The product dissolved in strong sulfuric acid with a deep green color. A low melting product can be extracted from this crude with solvents. It is characterized by its green color in sulfuric acid.

The details given above may be varied without departing from the spirit of the invention. The hydrofluoric acid need not be strictly anhydrous. Moisture is readily picked up by this acid and a slight content of water is without influence upon the reaction. Condensation still takes place when the acid is diluted with water to a strength of 80%. Instead of using a large amount of hydrofluoric acid, which acts both as condensing agent and solvent, a small amount may be used and other compounds not reacting with hydrofluoric acid, such as sulfuric acid, may be employed as the solvent. The reaction temperature may vary within wide limits, e. g., from −45° C. to 50° C. The excess of hydrofluoric acid used as the solvent may be recovered by heating the finished reaction mass, either at atmospheric pressure or under a slight vacuum.

While a number of examples have been given the process is generally applicable to the condensation, by means of liquid hydrofluoric acid, of an open chain alpha-beta unsaturated aldehyde with a polynuclear isocyclic hydrocarbon containing at least two fused benzene rings and alkyl, halogen, hydroxy, alkoxy, and sulfo substitution products thereof and therefore many more open chain alpha-beta unsaturated aldehydes and polynuclear isocyclic compounds than those mentioned in the examples may be employed in the process of the invention.

Suitable aldehydes coming within the above description and therefore within the scope of the invention are acrolein, alpha and beta acrolein, bromo acrolein, alpha-beta-dimethyl acrolein. The preferred aldehyde is acrolein.

Suitable isocyclic polynuclear compounds coming within the above description and therefore within the scope of the invention include 1,10-trimethylene-9-hydroxy phenanthrene, phenanthrene, 9,10-dihydro-anthracene,-acenaphthene, alpha or beta napththol, naphthol, naphthalene, methyl-9-10-dihydroanthracene, hydro-benzanthrene, 1-5-dihydroxy naphthalene. The preferred isocyclic polynuclear compounds are hydrocarbons and of these 1,10-trimethylene-9-hydroxyphenanthrene and 9,10-dihydroanthracene are particularly preferred.

Thus perinaphthindone is formed from alpha and beta naphthol, perylene is obtained from 1,10-trimethylene-9-hydroxy phenanthrene, or from phenanthrene, benzpyrene is formed from 9,10-dihydroanthracene, condensation products result from naphthalene, acenaphthene, 1,5-dihydroxy naphthalene, hydrobenzanthrene, and similar compounds by treatment with acrolein.

With regard to the strength of acid necessary for the reaction, there is no noticeable difference between a 97 or 100% HF, but reaction taking place with 80% HF at room temperature does so less readily.

The compounds formed initially may be mixtures of hydrogenated polynuclear isocyclic compounds from which pure isocyclic polynuclear compounds are obtained by the usual method of dehydrogenation.

The use of hydrofluoric acid makes condensations possible that could not be performed previously. The reaction taking place while remotely similar to the reaction by which benzanthrone is formed from reduced anthraquinones progresses farther in the presence of hydrofluoric acid than when the conventional condensing agents like sulfuric or phosphoric acid are used. It is known that benzanthrone is formed when phenanthrene is treated with acrolein (or glycerine) in sulfuric acid but hitherto it has never been possible to cause two moles of acrolein to condense with phenanthrene to form perylene. Similarly it is known that benzanthrene is formed from anthracene, or dihydroanthracene but a benzpyrene was never obtained by an acrolein condensation. Neither was it hitherto possible to form perylene from a benzanthrone reaction product. The compound formed between acenaphthrene and acrolein was hitherto unknown to the art. The hydrogenated perylene, benzpyrens, and acenaphthene condensation products as obtained from the condensation are also new compounds.

The use of hydrofluoric acid is therefore a distinct advance in the art of producing polynuclear isocyclic compounds.

The above description and examples are intended to be illustrative only. Any modification of or variation therefrom which conforms to the spirit of the invention is intended to be included within the scope of the claims.

I claim:

1. Process which comprises condensing an isocyclic polynuclear compound containing at least two fused aromatic benzene rings with an open chain alpha-beta unsaturated aldehyde of the formula R—CH=CR'—CHO wherein R and R' are saturated, univalent residues of the class consisting of hydrogen, alkyl and halogen in the presence of liquid hydrogen fluoride of at least 80% concentration.

2. Process of claim 1 wherein the aldehyde is acrolein.

3. Process of claim 1 wherein the isocyclic polynuclear compound is a hydrocarbon.

4. Process which comprises condensing an isocyclic polynuclear hydrocarbon containing at least two fused aromatic benzene rings with acrolein in the presence of liquid hydrogen fluoride of at least 80% concentration.

5. Process which comprises condensing 1,10-trimethylene-9-hydroxy phenanthrene with acrolein in the presence of liquid hydrogen fluoride of at least 80% concentration.

6. Process which comprises condensing 9,10-dihydroanthracene with acrolein in the presence of liquid hydrogen fluoride of at least 80% concentration.

7. Process of preparing non-resinous polynuclear isocyclic compounds containing a plurality of fused rings which comprises condensing a polynuclear isocyclic compound containing a less number of isocyclic rings, at least two of which are fused benzene rings, with an open chain alpha-beta unsaturated aldehyde of the formula R—CH=CR'—CHO wherein R and R' are saturated univalent residues of the class consisting of hydrogen, alkyl, and halogen, in the presence of essentially anhydrous liquid hydrogen fluoride.

8. Process of claim 7 wherein the aldehyde is acrolein.

9. Process of claim 7 wherein the isocyclic polynuclear compound is a hydrocarbon.

10. Process which comprises condensing an isocyclic polynuclear hydrocarbon containing at least two fused aromatic benzene rings with acrolein in the presence of essentially anhydrous liquid hydrogen fluoride.

11. Process which comprises condensing 1,10-trimethylene-9-hydroxy phenanthrene with acrolein in the presence of essentially anhydrous liquid hydrogen fluoride.

12. Process which comprises condensing 9,10-dihydroanthracene with acrolein in the presence of essentially anhydrous liquid hydrogen fluoride.

13. Process of preparing non-resinous polynuclear isocyclic compounds containing a plurality of fused rings which comprises condensing a polynuclear isocyclic compounds containing a less number of isocyclic rings, at least two of which are fused benzene rings, with an open chain alpha-beta unsaturated aldehyde of the formula R—CH=CR'—CHO wherein R and R' are saturated univalent residues of the class consisting of hydrogen, alkyl, and halogen, in solution in liquid hydrogen fluoride of at least 30% concentration.

14. Process of claim 13 wherein the aldehyde is acrolein.

15. Process of claim 13 wherein the isocyclic polynuclear compound is a hydrocarbon.

16. Process which comprises condensing an isocyclic polynuclear hydrocarbon containing at least two fused aromatic benzene rings with acrolein in solution in liquid hydrogen fluoride of at least 80% concentration.

17. Process which comprises condensing 1,10-trimethylene-9-hydroxy phenanthrene with acrolein in solution in liquid hydrogen fluoride of at least 80% concentration.

18. Process which comprises condensing 9,10-dihydroanthracene with acrolein in solution in liquid hydrogen fluoride in at least 80% concentration.

VIKTOR WEINMAYR.